Figure 1:
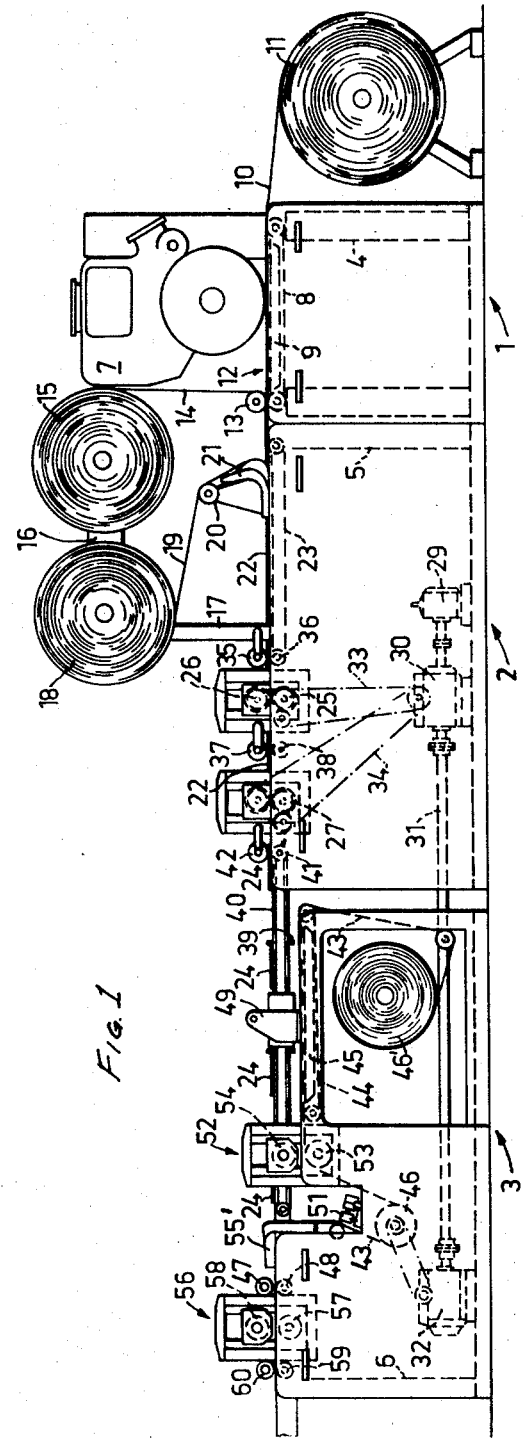

United States Patent

[11] 3,607,578

| [72] | Inventors | Bror Hugo Olof Berg<br>Gothenburg;<br>Erik Ragnar Johansson, Molndal, both of<br>Sweden |
|---|---|---|
| [21] | Appl. No. | 719,477 |
| [22] | Filed | Apr. 8, 1968 |
| [45] | Patented | Sept. 21, 1971 |
| [73] | Assignee | Molnlycke AB<br>Gothenburg, Sweden |
| [32] | Priority | Apr. 12, 1967 |
| [33] | | Sweden |
| [31] | | 5091/67 |

[54] APPARATUS FOR PRODUCING DISPOSABLE DIAPERS
4 Claims, 2 Drawing Figs.

[52] U.S. Cl. .................................................. 156/552,
156/377, 156/464
[51] Int. Cl. ..................................................... B32b31/10,
B32b 31/18
[50] Field of Search ........................................... 156/383,
465, 479, 517, 521, 552, 464; 128/284, 288;
83/333

[56] References Cited
UNITED STATES PATENTS
3,515,609   6/1970   Rudloff .................. 156/377 X
1,095,661   5/1914   Moulton .................. 83/333
2,131,808  10/1938   Joa ........................ 156/464 X
2,649,858   8/1953   LeBolt .................... 128/284
3,155,558  11/1964   Clapp ..................... 156/552 X Primary Examiner—Benjamin A. Borchelt
Assistant Examiner—James M. Hanley
Attorney—Young & Thompson ABSTRACT: An apparatus for producing disposable diapers, the absorption bodies of which are fastened to a sheet of plastic material shaped to conform to the body of the child, and serving as pants or diaper-holder whilst the diaper is in use. The apparatus having means which continuously produce and/or advance finished absorption bodies, means for advancing and combining a plastic web with gradually advanced absorption bodies and means positioned in the direction of movement of the plastic web and intended to provide the two side edges of the plastic web with recesses which impart to the finished diaper-holder a shape which conforms to the body of the child. The apparatus also having means arranged along the path of movement of the plastic web for applying adhesive on said web at positions where the absorption bodies are fastened thereto and pressure means arranged at the position where the absorption bodies and the plastic web meet and intended to press the bodies onto the adhesive-coated positions on said plastic web. After this pressure means cutting means, for instance a roll pair provided with knives, being arranged for clipping the plastic web into lengths appropriate for the intended diaper-holder.

PATENTED SEP 21 1971 3,607,578

INVENTORS
BROR HUGO OLOF BERG
ERIK RAGNAR JOHANSSON
BY Young + Thompson
ATTYS

APPARATUS FOR PRODUCING DISPOSABLE DIAPERS

The present invention is concerned with an apparatus for producing disposable diapers, the absorption bodies of which are fastened to a sheet of plastic material shaped to conform to the body of the child and serving as pants or a diaper-holder whilst the diaper is in use, the apparatus being provided with means which continuously produce and/or advance finished absorption bodies.

In the manufacture of known diapers of this type a sheet of plastic material is usually rolled out over large cutting tables on which the diaper-holders or pants are cut out either manually or by means of punches; whereafter absorption bodies are positioned on the diaper-holders which are also possibly provided with strips of adhesive tape for securing the diaper. Despite the fact that when in use the product produced according to this method offers many significant advantages, the method has caused the product to be too expensive resulting in only moderate demands commercially. The significance of a method which renders diapers of this type less expensive is thus obvious.

The object of the invention is therefore to provide an apparatus of the type described in the introduction which offers a significant increase in manufacturing capacity and a considerable reduction in the manufacturing costs as compared with previously known methods and apparatus: two factors which contribute towards a cheaper finished product. This object is achieved by means of the apparatus according to the invention which is mainly characterized in that it includes means for advancing and combining a web of plastic material with the gradually advanced absorption bodies; means positioned in the direction of movement of the web of plastic material and intended to provide both side edges of the plastic web with recesses which impart to the finished diaper-holder a shape which conforms to the body of the child, means also positioned along the path of movement of the plastic web and intended to coat said plastic web with an adhesive at positions where the absorption bodies are fastened thereto, pressure means positioned at the site where the absorption bodies and the plastic web are joined and intended to press the absorption bodies onto the adhesive-coated positions of the plastic web so that said bodies are firmly fastened to said web and means intended for clipping the plastic web into lengths appropriate for the intended diaper-holder, and which comprises, for instance, a pair of rolls provided with knifelike members and positioned behind the pressure means seen in the direction of movement of the web.

Figure 2:
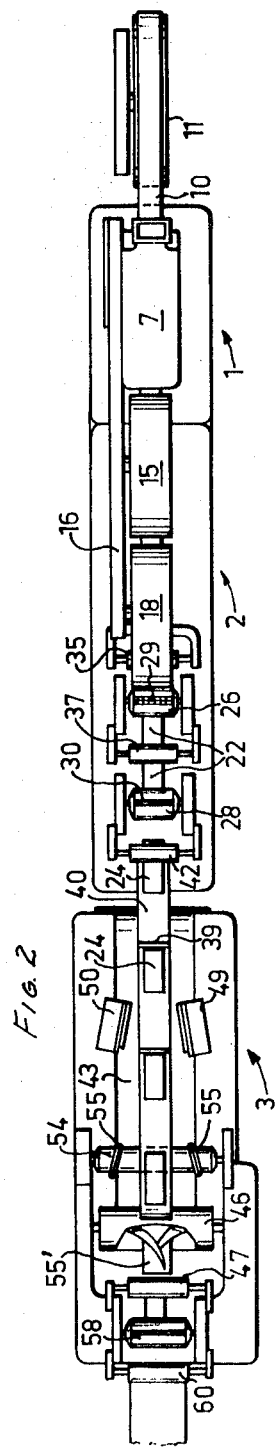

The invention will now be described with reference to the enclosed drawing which shows diagrammatically a particularly suitable embodiment of an apparatus according to the invention, and in which FIG. 1 shows the apparatus seen from one side thereof, and FIG. 2 shows the apparatus in plan view.

As shown in the drawing, the illustrated embodiment of an apparatus according to the invention is essentially comprised of three different main units, one unit 1 for producing and advancing a continuous string or web of absorption bodies, a unit 2 for clipping the continuous string of absorption bodies into individual absorption bodies compressed and embossed at the ends thereof, and a unit 3 for advancing the web of plastic material. Each of the three different means or main units 1, 2, 3 may be provided with its respective frame 4, 5 and 6 as shown in the drawing; whereby the different frames may possibly be secured together by means of bolts or the like. It is also possible to arrange the three main units on and within a common frame. Irrespective of whether the apparatus is provided with a common frame or the three different main units are each provided with a separate frame, welded beams may conveniently be used to form a frame structure. The frame or frames is or are preferably provided with a protection cover composed of detachable plates.

The means or unit 1 for producing and advancing a continuous string or web of absorption bodies is comprised, in turn, substantially of a batt forming means 7 of a type known per se and arranged above the frame 4, and an endless perforated conveyor belt 8, arranged in the upper portion of the frame 4 and extending over a suction box 9 which is open towards the belt, the said suction box also being attached in the upper portion of the frame 4. A subpressure is maintained in the suction box 9 which exerts a suction force acting through the belt 8. This force is utilized for two purposes. Firstly, it holds a first web 10 of cellulose tissue material against the belt 8 so that said belt is able to feed the web 10 into the apparatus from a storage roll or the like positioned upstream in relation to said apparatus. Secondly, the suction force also acts through the first tissue web 10 and thereby also holds a batt 12 of defibrated cellulose or the like, produced by the batt former 7, against the first tissue web 10 and the belt 8, whereby the web 10 and the batt 12 are advanced through the apparatus. The belt 8 and the batt former 7 are driven synchronously, via known transmission means (not shown), by means of a suitably common, transducer controlled DC motor (not shown). In the proximity of the downstream end of unit 1 is arranged a deflector roller 13, positioned on the top of the frame 4 and extending approximately at right angles across the belt 8 at a distance therefrom which substantially corresponds to the combined thickness of the web 10 and the batt 12. The purpose of the deflector roll 13 is to deflect a second web 14 of cellulose tissue which is unrolled from a storage roll 15, arranged on top of the apparatus so that the web 14 is drawn over the batt 12. The storage roll carrying the second tissue web 14 is suspended from a trestle 16 which can be supported at one end by the housing of the batt former 7 and at the other end may be supported by a support leg 17, secured to the frame 5 of the unit 12. The trestle 16 also carries a storage roll 18 for a third web 19 of a thin, fibrous, netlike material, e.g. nonwoven material. This web is passed from the storage roll 18 over a deflector roll 20 which is attached to the top of the frame 5 and extends substantially at right angles to the conveying direction of the string of absorption bodies which hitherto comprise the webs 10 and 14 made of tissue or similar material, and the batt 12, at a convenient distance above the string. The web is advanced further, through a known folding means 21 which is arranged at the top of the unit 2 so that the string of absorption bodies passes through the same; the web 19 comprising a thin, fibrous, netlike material being folded down by the folding means 21 over the two longitudinally extending edges of the string of absorption bodies and in under the first tissue web 10. When the web 19 has been folded under the first tissue web 10, the continuous string 22 of absorption bodies is completed. The deflector roller 20, as can be seen in FIG. 1, is positioned transversely of a second endless conveyor belt 23 which is actually arranged in the upper portion of frame 5 of the unit 2 to register with the belt 8 in unit 1. Despite the fact that for reasons of expediency said belt 23, the deflector roll 20 and the folding means 21 are positioned in or on the unit 2 in the shown embodiment, the function of these members is correlated with the unit 1 for producing and advancing the continuous string 22 of absorption bodies, and consequently, said members have been described together with the unit 1. As will be readily understood, the conveyor belt 23 should move synchronously with the batt former 7 and the conveyor belt 8, which is also driven more simply by means of a suitable transmission from the conveyor belt 8 in the unit 1.

The means or unit 2 for clipping the string 22 of absorption bodies into individual absorption bodies 24, which are compressed and embossed at the ends thereof, comprises—in addition to the aforementioned members 20, 21 and 23 which in the shown embodiment actually belong to the unit 1 and are only positioned in or on the unit 2 for reasons of expediency—substantially two pairs of cooperating rolls 25, 26 and 27, 28 arranged one behind the other on top of the frame 5 so that the string 22 of absorption bodies passes between the rolls forming part of each pair; said rolls being arranged approximately at right angles to the string of absorption bodies. The rolls 25, 26 in the first roll pair are provided around their periphery with compressing and embossing elements 29 which extend in the longitudinal direction of the rolls, and the rolls 27, 28 in the second roll pair are provided at the periphery thereof with cutting edges 30, also extending in the longitudinal direction of the rolls. Instead of presenting one separate roll pair for compressing and embossing purposes and one separate roll pair for clipping purposes, the unit 2 may, in certain instances, need only be provided with one pair of cooperating rolls which, in this instance, are provided at their periphery with compressing and embossing elements and also cutting edges, all extending in the longitudinal direction of the rolls. The two roll pairs 25, 26 and 27, 28 are driven in a known manner by means of an electric motor 29 arranged in the bottom of the frame 5, the output shaft of said motor being connected to a worm gear 30 which is also mounted in the bottom portion of the frame 5 and from which a shaft 31 passes to a similar worm gear 32 arranged in the bottom portion of the unit 3 in the frame 6, and chain transmissions 33 and 34 extending to the roll pair 25, 26 and 27, 28. A holder roll 35 is suitably mounted for free rotation between the support leg 17 and the roll pair 25, 26, for instance at the support leg 17, and adapted to extend across the string 22 of absorption bodies in abutment therewith. The holder roll 35 is conveniently mounted above the downstream deflector roll 36 of the conveyor belt 23 to hold the webs and the batt in the string together upstream the roll pair 25, 26, in which pair the string is compressed and embossed at the positions where it is to be clipped in individual absorption bodies, said compressing and embossing being used to join the different webs and batt in the absorption bodies in the future. A second holder roll 37 is suitably mounted for free rotation between the rolls pairs 25, 26 and 27, 28, for instance at one of the securing frames of the said roll pairs, and adapted to extend across the string 22 of absorption bodies in abutment therewith. The holder roll 37 is conveniently mounted centrally above a cooperating driven roll 38 which lies against the bottom surface of the string of absorption bodies and assists in advancing the string to the roll pair 27, 28 between the rolls of which the string is clipped into individual absorption bodies of suitable lengths and compressed and embossed at the ends thereof. The absorption bodies 24, subsequent to being clipped into appropriate lengths, are fed from the roll pair 27, 28 and conveyed by means of a third endless conveyor belt 40 provided with carrier members 39 and which is arranged to register with the previously mentioned conveyor belts 10 and 23, and the upstream deflector roll 41 of which is arranged in the proximity of the position where the absorption bodies leave the roll pair 27, 28. A third holder roll 42 is suitably mounted for free rotation at, for instance, the securing frame of the last mentioned roll pair and arranged to extend across the string of absorption bodies and positioned opposite to the upstream deflector roll 41 of the conveyor belt 40. Although the conveyor belt 40 is arranged so that its upstream end is located in the upper portion of the unit 2, the greater portion of the belt extends across the unit 3 in which its downstream end is also located. The belt 40 is suitably driven by means of a chain transmission from the worm gear 30 arranged in the bottom portion of the unit 2, which thus means that the belt 40 is driven synchronously with the roll pair 25, 26 and 27, 28 for compressing and embossing and also clipping the string 22 into individual absorption bodies. As previously mentioned, the belts 8 and 23 are, on the other hand, driven synchronously with the batt former 7.

The means or unit 3 for advancing the web 43 of plastic material which to render it innocuous to the skin may comprise a plastic-coated cellulose tissue or may also be comprised of polyethylene, polyvinyl chloride or the like, thus in addition to the actual means for advancing the plastic web 43, also presents the conveyor belt 40 positioned in immediate connection with the clipping means; the carrier arms of said belt 40 being arranged in uniform spaced relationship for advancing the individual absorption bodies clipped from the string 22 to a position where said bodies are joined by the plastic web 43. The means which actually advances said web 43 substantially comprises a perforated endless conveyor belt 44 positioned in the plane of the top portion of the frame 6 and passing in the same direction as the conveyor belt 40, but below the same, over a suction box 45 which is open towards the belt; the box 45, similarly to the belt 44, being arranged in the upper portion of the frame 6. A subpressure is maintained in the suction box 45 which exerts a suction force acting through the belt 44. This force is utilized to hold the plastic web against the belt so that said belt is capable of advancing the plastic web into the apparatus from a storage roll 46 which carries the plastic web and which is mounted in the frame 6, below the suction box 45, for instance. In addition to the belt 44 the plastic web is also advanced by a roll 46 serving as a deflector roll and a feed roll and which is arranged downstream of the frame 6 in relation to the belt 44. The plastic web and the absorption bodies are finally advanced together between a pair of driven holder and feed rolls 47, 48 arranged downstream in relation to the roll 46 and behind the station where the plastic web and the individual absorption bodies 24 meet. All means for advancing the plastic web, i.e. the conveyor belt 44 and the rolls 46, 47 and 48 are driven synchronously by the motor 29 via chain transmissions (not shown) from the worm gear 32 at the bottom portion of the frame 6. In that the worm gear 32 is coupled directly to the worm gear 30 by means of the shaft 31, the said advancing means for the plastic web are also driven synchronously with the belt 40 for advancing the clipped individual absorption bodies 24 and with the roll pair 25, 26 and 27, 28 for effecting the compression and embossment of the string 22 of absorption bodies, and the clipping of said string into individual absorption bodies.

Disposed along the feed path of the plastic web 43 are means 49, 50 positioned opposite each other, one on either side edge of the web for applying adhesive strips to the plastic web during its passage through the apparatus. In the shown embodiment the two means 49, 50 are arranged on top of frame 6 so that they project in over the plastic web within the region occupied by the conveyor belt 44. A means 51 is also positioned along the feed path of the plastic web and adapted to apply an adhesive to the web at the positions where the absorption bodies 24 are to be secured on said web. The means 51, as shown in FIG. 1, may be arranged on the frame 6 and adapted to abut the plastic web on which it applies beads of adhesive at the appropriate positions. The means 51 must, of course, then be arranged upstream the station where the plastic web meets the individual absorption bodies, and suitably downstream the roll 46 since otherwise some of the adhesive might stick to the roll which would affect the feeding of said web. The dispensing of adhesive from the means 51 may be regulated, for instance, by means of an electric signal issued by the absorption body 24, for which the adhesive is intended, when it is advanced by the belt 40 towards the station at which it is joined to the plastic web. The electric signal is most simply provided by means of a switch (not shown) arranged along the path of the belt 40, at the same distance from said meeting place as the distance of the means 51 along the path of movement of the plastic web from said meeting place. The switch should be provided with a suitable sensing element which abuts the absorption body 24 as it moves on the belt 40 past the switch.

Before the plastic web has been supplied with adhesive for securing the absorption bodies thereto, it is convenient to provide the said web with recesses along the side edges thereof which impart to the finished diaper-holder a shape conforming to the body of the child. These recesses should be made at regularly spaced intervals in the longitudinal direction of the web so that said recesses on the one side edge lie opposite the recesses on the opposite side edge. For this purpose a cutting roll means 52 is arranged along the advancing path of the plastic web on the frame 6, between the downstream end of the belt 44 and the roll 46. The cutting roll means includes two cooperating rolls 53, 54 between which the plastic web is arranged to pass; the one roll 53 being provided with a smooth barrel surface and the second roll 54 presenting cutting edges 55 extending around the barrel surface thereof. One such cutting edge is arranged in the proximity of either end of the roll 54, the two edges each being arranged in a plane extending obliquely to the roll so that the two edges on one roll-surface generatrix present a smaller distance therebetween while the said edges on the diametrically opposed generatrix present a widest distance from each other. The cutting means 52 is driven by the motor 29 by means of a conventional (not shown) chain transmission driven via the worm gear 32. This means that the cutting roll means operates synchronously with the means for advancing the plastic web and the separate, individual absorption bodies.

Subsequent to providing the plastic web with the said recesses and applying the adhesive thereto, which is applied midway between two of the opposing pairs of recesses on the side edges of the web, the associated absorption body is pressed onto the plastic web at the appropriate positions thereon with its longitudinal axis approximately in the longitudinal direction of said web. This is effected at the station where the separate, individual absorption bodies 24 and the plastic web 43 meet where the pressure means is also situated. The pressure means comprises a guide plate element 55 which presses the absorption bodies against the plastic web. To facilitate possible, subsequent stacking and packaging of the diapers the pressure means or guide plate element 55 may be designed so that whilst pressing the absorption bodies onto the plastic web it also simultaneously folds, in a known manner, the portions of the plastic web extending along the sides of the longitudinal edges of the absorption bodies over the absorption bodies, and one another.

Subsequent to the absorption bodies being fastened to the plastic web in the guide plate element 55 and the edge portions of the plastic web have been folded simultaneously in said element, the folded plastic web together with the absorption bodies adhered thereto are advanced by the previously mentioned roll pair 47, 48 into a clipping means 56, which in the shown embodiment comprises a roll pair 57, 58 provided with knives and which is driven by the motor 29 by means of a conventional (not shown) chain transmission from the worm gear 30 and finally clips the plastic web 43 in lengths appropriate for the intended diaper. The thus partially folded diapers are then fed out between a pair of rolls 59, 60 onto a conveyor belt (not shown) for removal from the apparatus according to the invention.

It will be understood from the aforegoing that all means in the apparatus employed for advancing the separate, individual absorption bodies and the plastic web and also the means for clipping the absorption body string into individual absorption bodies with the ends thereof compressed and embossed, the means for applying the strips of adhesive, the cutting roll means and the means for clipping the plastic web are all driven synchronously with one another by chain transmissions from a worm gear system arranged in the bottom portion of the apparatus and driven by an electric motor, while on the other hand all arrangements adapted to advance the continuous string of absorption bodies are driven synchronously by another electric motor. By controlling the speed of the last mentioned electric motor and maintaining a constant speed on the first mentioned electric motor, it is possible to obtain individual absorption bodies of different lengths.

The plastic waste created at the cutting roll means 52 may be collected at this position, for instance by suction means (not shown) so that said waste is not entrained with the plastic web causing breakdowns or interruptions in operation.

Although the invention has been described with reference to the embodiment of the same, the apparatus can in practice be varied arbitrarily without departing from the spirit of the invention.

What we claim is:

1. Apparatus for producing disposable diapers of the type comprising a liquid-absorptive body secured to a sheet of thin flexible plastic material, comprising a perforated endless conveyor belt for advancing a continuous web of thin flexible plastic from a supply of plastic web, a suction box on the opposite side of the conveyor belt from the plastic web for exerting suction through the conveyor belt to draw the plastic web against the conveyor belt, a roll pair for cutting recesses in the opposite side edges of the plastic web, said roll pair having knives mounted on at least one of said rolls for cutting said recesses from the edges of said web as said web passes between said rolls and being disposed to contact the plastic web immediately the web leaves said perforated endless conveyor belt, means to advance and apply a plurality of said absorptive bodies to the web after the web has passed said roll pair, means to apply adhesive between the web and the absorptive bodies before the absorptive bodies are applied to the web, and means for thereafter severing the web into a plurality of lengths each of which has a said absorptive body adhesively secured thereto.

2. Apparatus as claimed in claim 1, and pressure means for pressing said absorptive bodies against the web.

3. Apparatus as claimed in claim 1, one of said rolls having a smoothly cylindrical surface and the other of said rolls having cutting edges thereon that extend around the roll and are disposed adjacent opposite ends of said other roll, said edges being disposed in planes that are inclined to the roll so that said edges on said other roll have a least distance therebetween that lies along a first generatrix of the surface of said other roll and a greatest distance therebetween that lies along a second generatrix of the surface of said other roll that is diametrically opposite said first generatrix.

4. Apparatus as claimed in claim 1, and means for applying adhesive strips to the web for retaining the diapers on the body of the wearer.